May 28, 1963  J. MAURICE ET AL  3,091,315
CENTRIFUGAL CLUTCHES
Filed March 17, 1959  2 Sheets-Sheet 1

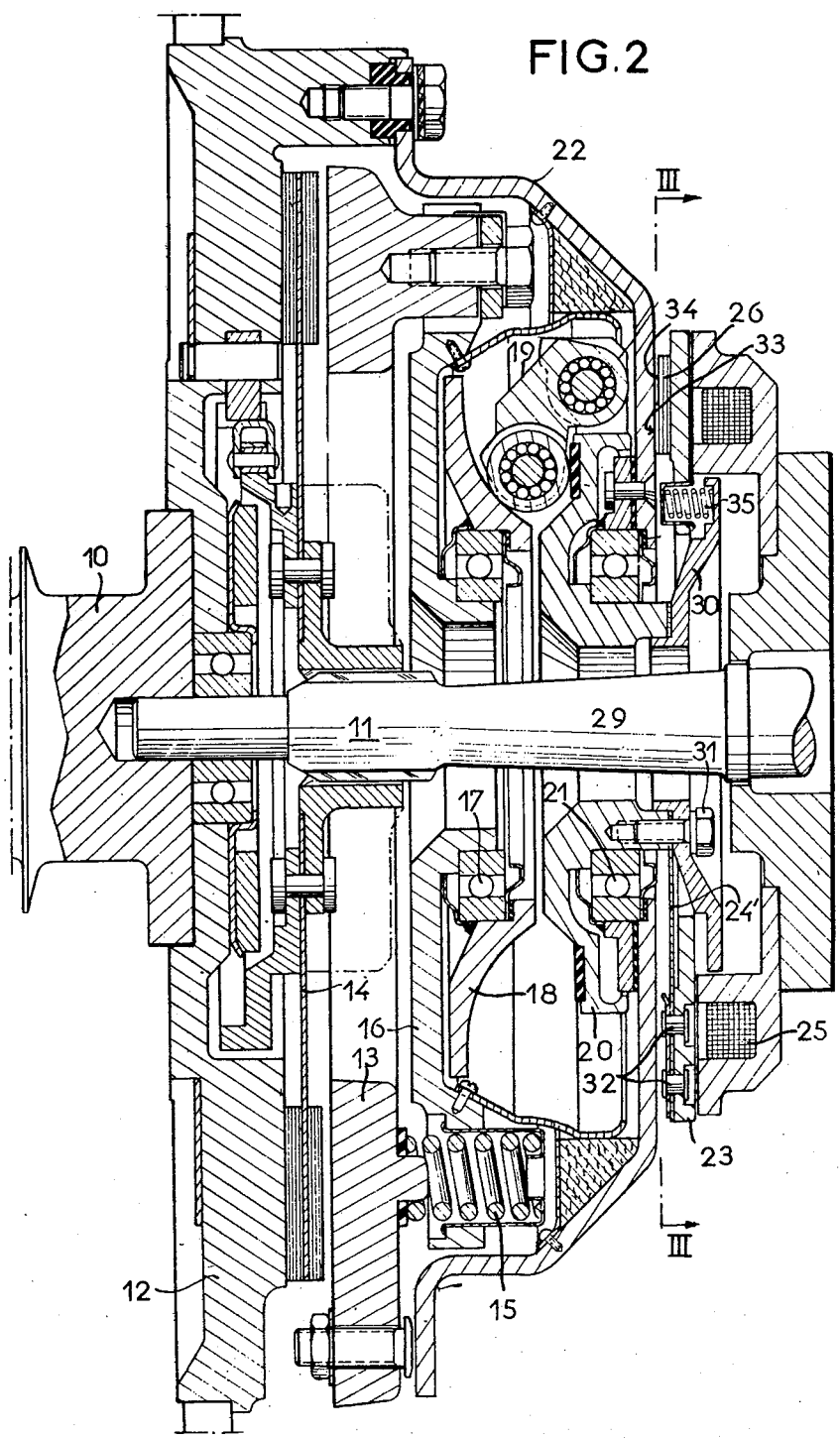

United States Patent Office 3,091,315
Patented May 28, 1963

3,091,315
CENTRIFUGAL CLUTCHES
Jean Maurice and Michel Rist, Paris, France, assignors to Societe Anonyme Francaise du Ferodo, Paris, France, a corporation of France
Filed Mar. 17, 1959, Ser. No. 799,899
Claims priority, application France Nov. 26, 1955
6 Claims. (Cl. 192—105)

The present invention is a continuation-in-part of our co-pending application No. 608,783 now Patent No. 2,907,433 granted October 6, 1959 filed on September 10, 1956 and of our co-pending application No. 712,810 now Patent No. 2,987,155, granted June 6, 1961 filed on February 3, 1958 and it relates to a centrifugal clutch of the type having a driving unit, a driven assembly adapted to be driven by said driving unit through frictional engagement, a weight carrier, a transfer assembly associated with said carrier for producing said frictional engagement dependent upon the speed of the weight carrier, and means for frictionally coupling at will said carrier to said driving unit. The Patent No. 2,907,433 claims means for modifying, at least during certain period of use, the driving torque of the weight-carrier from the driving unit. The application No. 712,810 claims the provision of a peripherally axially projecting portion of a cam of the transfer assembly for encircling the weights to be abutted by them.

An object of our invention is a centrifugal clutch of the above type which more particularly has a silent operation and comprises flexible radial arms for connecting the weight carrier to a movable member selectively frictionally engaging the driving unit.

The invention will now be described, by way of example, with reference to the accompanying drawings in which:

FIG. 2 is a view in longitudinal cross-section of an alternative form of a centrifugal clutch in accordance with the invention;

Figure 1:
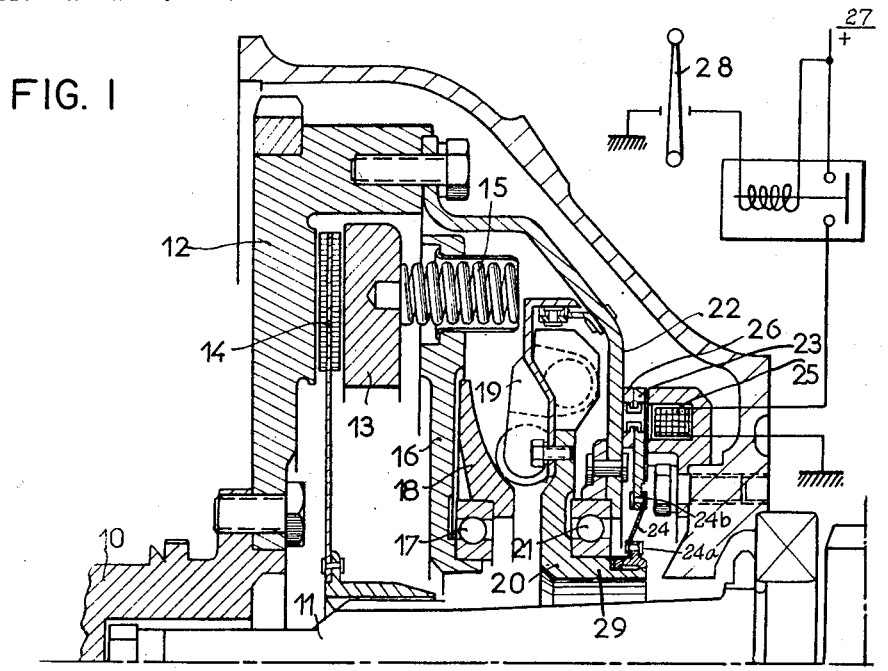
FIG. 1 is a half-view of a centrifugal clutch in accordance with the invention in longitudinal cross-section.

In the form of construction shown in FIG. 1 which concerns, by way of example, an application of the invention to a centrifugal clutch for automobile vehicles, there can be seen in FIG. 1, at 10 the driving shaft, and at 11 the driven shaft of the clutch. The driving shaft 10 is rigidly fixed to a fly-wheel 12 which forms a support plate. This plate co-operates with a pressure-plate 13, which is fast for rotation with it, so as to grip a friction disc 14 which is itself fixed for rotation with the driven shaft 11.

The pressure-plate 13 is pushed by means of springs 15 and by a transfer-plate 16. This transfer-plate is fixed for lateral movement with a cam 18 with respect to which it can rotate by means of a bearing 17. With the cam 18 are adapted to co-operate centrifugal pushing weight-heads 19 with rollers, carried by a weight-head carrier 20. The weight-head carrier 20 is mounted free for rotation by means of a bearing 21 in a casing 22 fixed to the driving fly-wheel 12.

An axially movable member 23 is mounted rigid in rotation by means of flexible radial arms or tongues 24 on the weight head carrier 20 and can be made coupled either with an electro-locking magnet 25 or with the rotatable driving casing 22. The inner end of the tongues 24 is positively fixedly attached by first headed uniting means such as rivets 24a to a rear end portion of a rear hollow central boss 29 of the carrier 20 while the outer end is fixed to the member 23 by second headed uniting means such as rivets 24b. This arrangement has the advantage of avoiding the intervention of any sliding means such as splines or flutes which produce noise.

A friction lining 26 is provided between the member 23 and the casing 22. It is the flexibility of the small tongues 24 which brings and retains the member 23 in contact with the casing 22, with the interposition of the lining 26, when the electromagnet 25 is deenergized. This electro-magnet 25 is supplied from any suitable source of current such as the battery 27 of the vehicle, and is made active or deenergized automatically, depending on whether the gear-changing lever 28 is operated or released.

In operation, when the lever 28 is released the electromagnet 25 is deenergized so that the flexible radial tongues 24 can push the member 23 in frictional engagement at 26 against the casing 22. The carrier 20 thus rotates in unison with the driving assembly 10—12—22 and the centrifugal weights 19 push axially on the cam 18, the plate 16 and through the springs 15 on the plate 13 whereby the disc 14 is gripped between plates 12 and 13 with a force which depends on the speed of the driving shaft 10.

When the lever 28 is actuated, the electromagnet 25 is energized and overcomes the flexible radial tongues 24 so that the member 23 is locked by the electromagnet 25. The carrier 20 is thus made stationary and the weights 19 are down. The disc 14 is released between the plates 12 and 13.

It will be noted that the tongues 24 in accordance with the invention constitute in operation a coupling centering means between the carrier 20 and the member 23 enabling an axial motion of the member 23 with respect to the carrier 20 while they constitute furthermore an elastic means urging the member 23 axially towards the casing 22.

Figure 3:
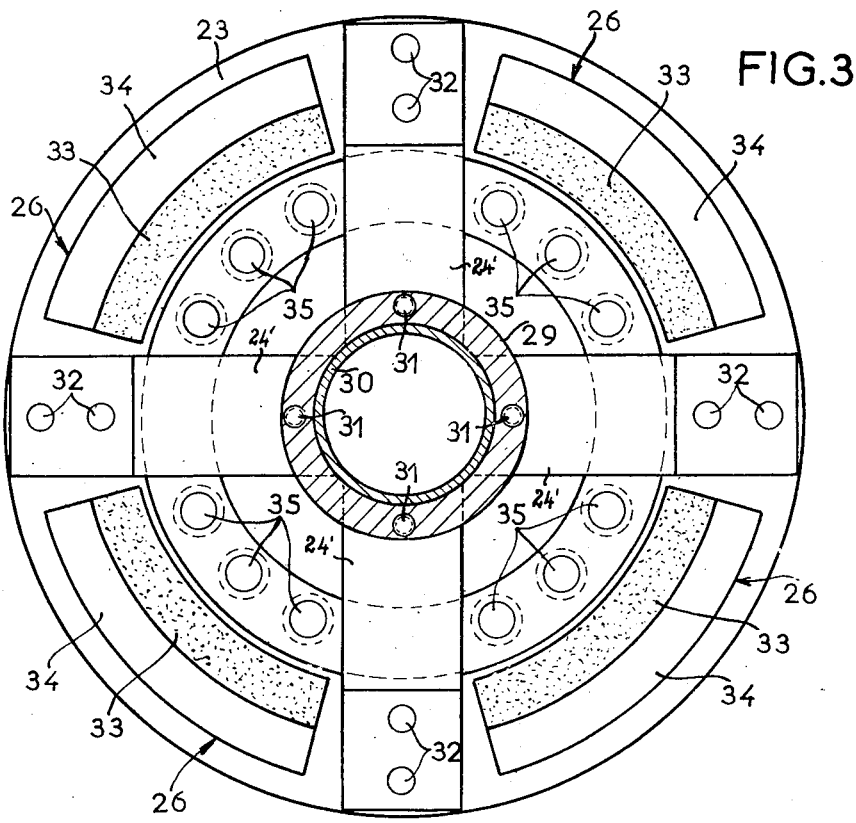
FIG. 3 is a view in elevation in the direction of the arrows II—II of FIG. 2 of a portion of the clutch of FIG. 2.

Reference will now be made to FIGS. 2 and 3 where the arrangement is similar to that of FIG. 1 but where the arms or tongues 24 here numbered 24' constitute only a coupling centering means between the carrier 20 and the member 23 enabling an axial motion of the member 23 with respect to the carrier while a separate elastic means 35 is provided for urging the member 23 towards the casing 22.

In more detail a rigid flange 30 which forms a dished rear plate and extends behind the casing 22, is positively fixed by first headed uniting means such as screws 31 to the rear end portion of the carrier boss 29, while a number of flexible radial tongues 24' extend between the flange 30 and the casing 22, and are gripped between the members 29 and 30 by the screws 31. At their outer extremities, the tongues 24' are fixed by second headed uniting means such as rivets 32 to the member 23 which they thus maintain correctly centered and rigidly fixed for rotation, while by virtue of their flexibility they permit axial movements of the said member 23.

The rear face of the member 23 co-operates with the fixed immobilising electro-magnet 25 while its front face is lined with the friction lining 26 here formed by arcuate elements or sectors which alternate with the tongues 24'. The elements 26 which are intended to be in frictional engagement with the casing 22 have here a section of stepped or tiered form so that only their portion 33 which is the closest to the axis and to the springs 35 is permitted to come into contact, while the other portion 34 is not in contact.

The supporting surfaces of the linings 26 on the member 23 is large since, in addition to the active portion 23, it comprises the portion 24. This permits of a very strong adhesion of the linings 26 on the member 23 and results in complete suppression of noise and vibration. In addition, the reduced radial width of the active portion 33 permits a satisfactory application against the casing 22, even if the member 23 or the casing 22 are not strictly flat or become deformed during the course of operation.

The springs 35 are helicoidal distributed in circular symmetry, and arranged in the vicinity of the active parts 33 of the elements 26. The springs 35 act between the flange 30 and the member 23 so as to ensure the application of the elements 26 against the casing 22 when the electro-magnet 25 is deenergized, the tongues 24' taking no substantial part in this applying action and serving only to keep the member 23 centered during the course of its movements, and to form a coupling fast for rotation between the member 23 and the weight-head carrier 20.

The coefficient of elasticity of the helicoidal springs 35 may be chosen to be small since these springs, which are distant from the axis are numerous, twelve in the example shown, and by their helicoidal nature have a strength which varies only slightly with variations in elongation, due to wear of the linings 26. The force of application being distributed very uniformly in the immediate vicinity of the zone of application 33, a large transmitted torque is obtained for a given effort. This torque is subject only to negligible variations during working. The pre-stress of the set of springs 35 may be made moderate by reason of the fidelity of the characteristics of the springs 35, which enables the restoring force of the electro-magnet 25 to be limited.

What is claimed is:

1. A centrifugal clutch comprising a driving unit, a driven assembly adapted to be driven by said driving unit through frictional engagement, a weight carrier supported free in rotation by said driving unit and being axially stationary, a transfer assembly axially movable with respect of said driving unit for controlling said frictional engagement between said driving unit and said driven assembly, weights carried by said carrier and adapted to push axially said transfer assembly so that said frictional engagement is centrifugally dependant upon the rotational speed of said carrier, and coupling means for selectively frictionally coupling said carrier to said driving unit, said coupling means having a rearwardly axially projecting central boss of said carrier, said boss being axially stationary and having a rear end portion an annular member located on the rear side of said unit and surrounding said boss, friction linings between said member and said unit having a frictional area extending substantially in a plane perpendicular to the clutch axis, a plurality of flexible radial plane arms substantially coplanar with said frictional area, angularly spaced from each other and each presenting an inner end and an outer end, first headed uniting means for positively attaching said inner end of said arms to said rear end portion of said boss, and second uniting means for positively attaching said outer end of said arms to said member.

2. A centrifugal clutch as claimed in claim 1 wherein said second uniting means are arranged at the said member periphery.

3. A centrifugal clutch as claimed in claim 1 wherein said friction linings are fixed to said member and comprise separate sectors, said second uniting means being alternated with said sectors.

4. A centrifugal clutch as claimed in claim 1 further comprising a dished rear plate fixed to said carrier boss, helical springs axially acting between said member and said dished rear plate and disposed in groups alternated with said radial arms, wherein said friction linings are fixed to said member and surround said springs, said linings comprising separate sectors each corresponding to one of said springs groups, said second uniting means being alternated with said sectors.

5. A centrifugal clutch as claimed in claim 4 wherein the inner end of each radial arm is arranged between said carrier boss and said dished plate and is compressed therebetween by said first uniting means.

6. A centrifugal clutch as claimed in claim 1 wherein said second uniting means are arranged at the said member periphery and comprise for each arm a pair of rivet means radially spaced from each other.

References Cited in the file of this patent

UNITED STATES PATENTS

| | | |
|---|---|---|
| 1,810,360 | Loeffler | June 16, 1931 |
| 2,522,622 | Laurant | Sept. 19, 1950 |
| 2,646,519 | Kalikow et al. | July 21, 1953 |
| 2,739,683 | Gamundi | Mar. 27, 1956 |
| 2,982,385 | Gamundi | May 2, 1961 |

FOREIGN PATENTS

| | | |
|---|---|---|
| 1,152,400 | France | Sept. 2, 1957 |